Nov. 11, 1924.                    J. C. CHRISTIANSEN                    1,515,296
                                  MECHANICAL INSECT TRAP
                                   Filed June 13, 1921
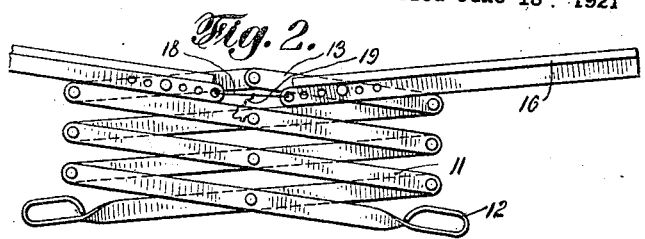
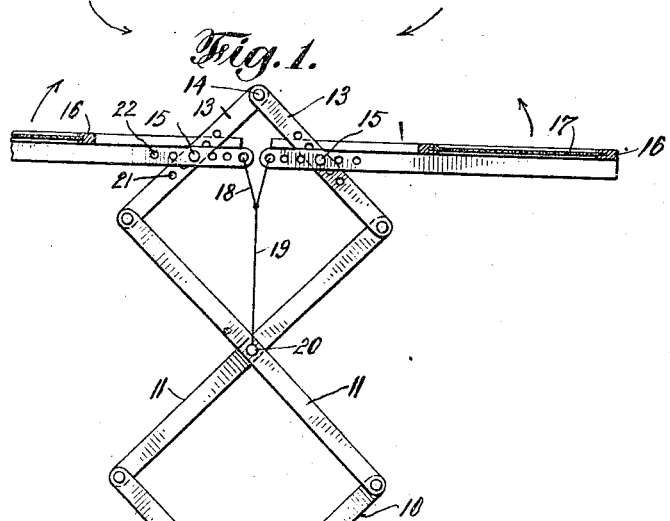
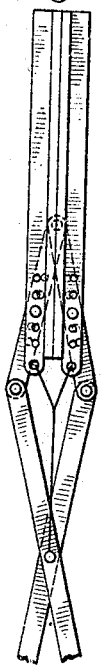
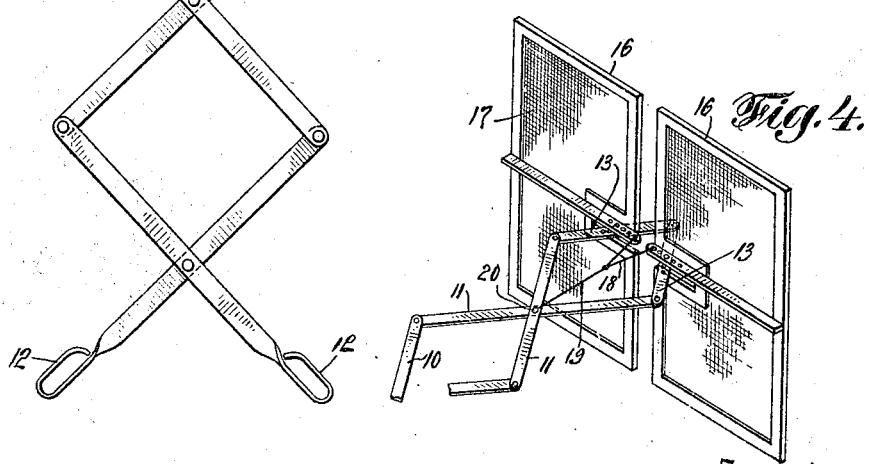
Inventor
J. C. Christiansen
By his Attorney Patented Nov. 11, 1924.

1,515,296

UNITED STATES PATENT OFFICE.

JULIUS C. CHRISTIANSEN, OF NEW YORK, N. Y.

MECHANICAL INSECT TRAP.

Application filed June 13, 1921. Serial No. 477,157.

*To all whom it may concern:*

Be it known that I, JULIUS C. CHRISTIANSEN, a citizen of Germany, and resident of the city of New York, in the county of New York and State of New York, have invented certain new and useful Improvements in Mechanical Insect Traps, of which the following is a specification.

The present invention relates to improvements in insect traps, and more particularly to devices or implements for catching flies.

The main object of the invention is to produce a simple and inexpensive mechanical insect trap, that is to say a manually operated means for catching insects.

Another object of the invention is to provide a trap of the character mentioned which is capable of manufacture on a commercial scale, or in other words one which is not so difficult to make as to be beyond the reasonable cost of such a contrivance.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

Two of the many possible embodiments of the invention are illustrated in the accompanying drawings, in which:—

Figure 1 is a plan view of a trap constructed in accordance with the present invention, in its partially extended state; Fig. 2 is a similar view of the device in its folded state; Fig. 3 is a similar view of the trap with its elements in their closed positions; Fig. 4 is a perspective view of a portion of the device.

Referring now first to Figs. 1 to 4, inclusive, of the drawings, the numeral 10 indicates a supporting element, in the form of a lazy-tong construction, which consists of a series of diagonal levers 11, pivoted together in the middle and at the ends. The innermost levers of the construction are provided with handle members 12, while the outermost levers are joined by links 13, which are pivoted together at their outer ends, as shown at 14. To each link is pivoted at 15 a frame 16, said frames extending at right angles to the general plane of the lazy-tong construction and being covered with suitable sheet material 17, for instance wire fabric or rubber. The two frames are connected by a flexible means 18, for instance a piece of cord, which passes, preferably, centrally through the juxtaposed edges of the said frames and is connected by a piece of cord 19 with the pivot 20, passing through the middle portions of the outermost levers 11.

The operation of this device is as follows: When the lazy-tong construction is in its collapsed state, as shown in Fig. 2 of the drawings, the frames 16 are located in substantially the same plane. If it is intended to catch an insect, either on its wings or while resting on a support, the operator grasps the handle members 12 and causes the same to swing around their pivot in the direction of the arrow shown in Fig. 2 of the drawings, thereby extending the lazy-tong construction, thus bringing the elements into the positions shown in Fig. 1 of the drawings, in which the frames are still located in a single plane, but the cord element 19 is drawn taut. By continuing now the extension of the lazy-tong construction, the cord elements 18 and 19 cause the frames 16 to swing around their pivots 15 in the directions of the arrows shown in Fig. 1 of the drawings until they abut against each other, or in other words until they are brought into parallel relation, thereby trapping the insect.

When the lazy-tong construction is collapsed, the frames are automatically brought back into the positions shown in Fig. 2 of the drawings, whereby the contrivance is again ready for operation.

Each of the links 13 may be provided with a row of holes 21 and each of the frames 16 with a row of holes 22, through which holes the pivots 15 above referred to are passed. This construction permits of an adjustment of the frames on the support 10.

When the lazy-tong construction of the device is extended, the frames 16 move toward closing position only after the lazy-tong construction has been partly extended.

What I claim is:—

1. A fly trap comprising a support in the form of a lazy-tong construction provided upon one of its ends with handle members, and two fabric-covered frames carried by the other end of said support, a flexible connection between said frames, and a flexible connection between said first mentioned flexible connection and said support, said frames being in substantially the same plane when said lazy-tong construction is in its collapsed state and moving toward parallel relation when said lazy-tong construction is near the end of the outward motion.

2. A fly trap comprising a support in the form of a lazy-tong construction provided upon one of its ends with handle members, two fabric-covered frames pivoted to the other end of said support, a flexible connection between said frames, and a flexible connection between said first-mentioned flexible connection and said support, whereby said frames are brought into substantially the same plane when said lazy-tong construction is collapsed and caused to move around their pivots toward parallel relation when said lazy-tong construction is being extended.

3. A fly trap comprising a support in the form of a lazy-tong construction provided upon one of its ends with handle members, two links pivoted together and joined with the other end of said support, a fabric covered frame pivoted to each of said links, a flexible connection between said frames, and a flexible connection between said first mentioned flexible connection and the pivot pin passing through the middle portions of the outermost levers of said lazy-tong construction.

Signed at New York, in the county of New York and State of New York, this 28th day of May, A. D. 1921.

JULIUS C. CHRISTIANSEN.